Sept. 22, 1959 L. O. CARLSEN 2,905,007
BACKLASH-FREE SPINDLE DRIVE GEARING
Filed March 29, 1957 2 Sheets-Sheet 1

INVENTOR.
LEONARD O. CARLSEN
BY Richard W. Treverton
ATTORNEY

Sept. 22, 1959 L. O. CARLSEN 2,905,007
BACKLASH-FREE SPINDLE DRIVE GEARING
Filed March 29, 1957 2 Sheets-Sheet 2
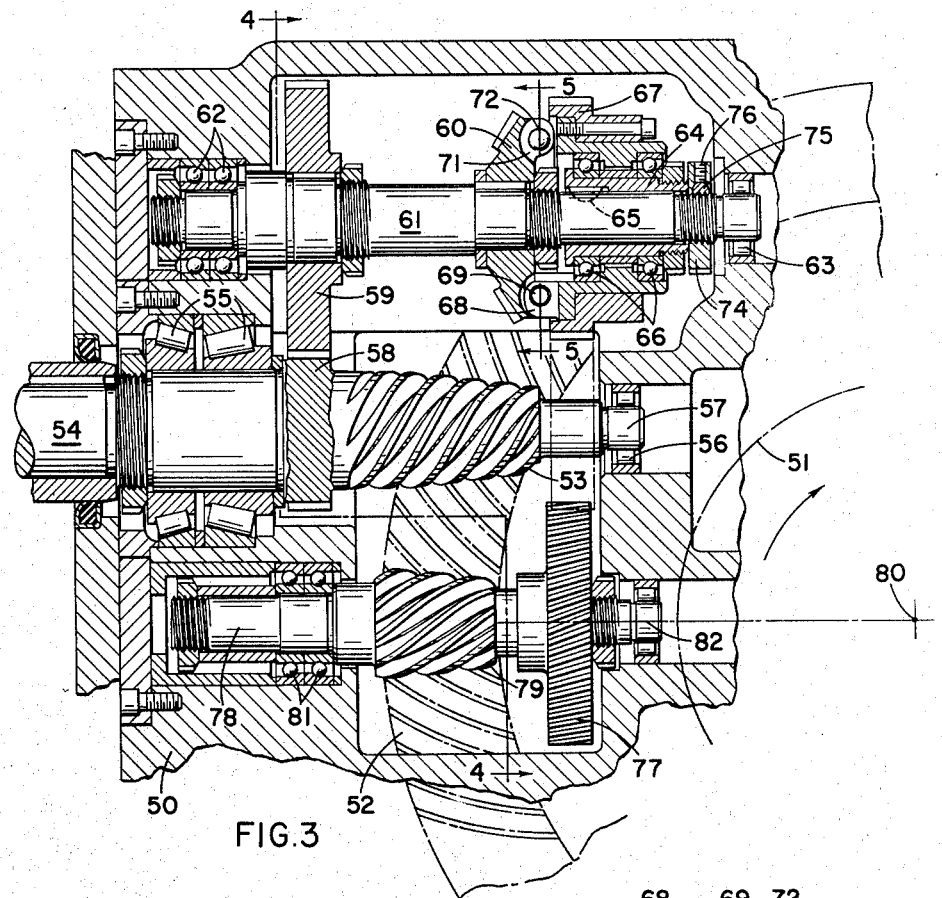
FIG. 3
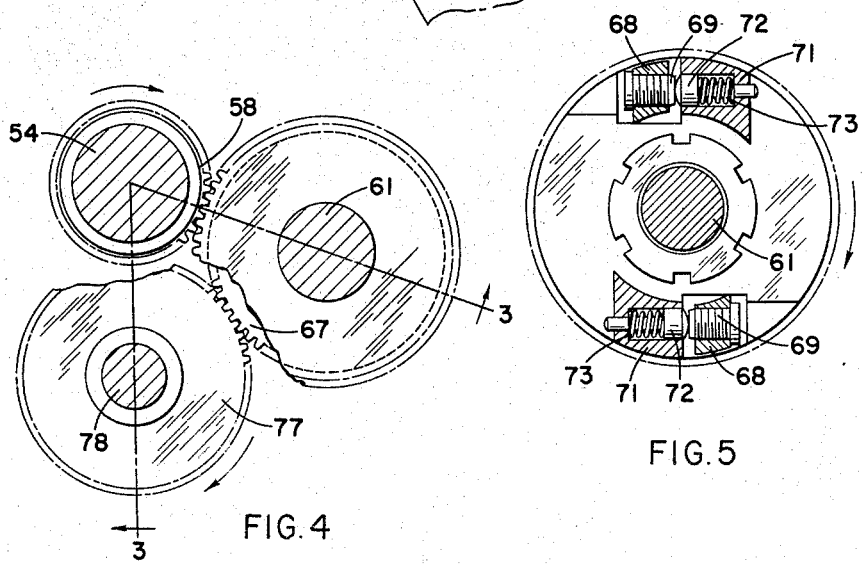
FIG. 4
FIG. 5

United States Patent Office 2,905,007
Patented Sept. 22, 1959

2,905,007

BACKLASH-FREE SPINDLE DRIVE GEARING

Leonard O. Carlsen, Rochester, N.Y., assignor to The Gleason Works, Rochester, N.Y., a corporation of New York Application March 29, 1957, Serial No. 649,434

15 Claims. (Cl. 74—409)

The present invention relates to machine tools, such as gear cutting machines, and particularly to an improved spindle drive gearing for such tools which will be free of backlash and also will have a high degree of accuracy and the ability to withstanding heavy cutting loads.

In order to meet these objectives the invention employs a driven gear, preferably mounted on the spindle, and two pinions meshing with the gear, one pinion being power-driven and the other being adapted to be driven by the gear, and a drive connection between the pinions comprising a torsion spring device for continuously exerting torque to maintain the other pinion in engagement with the sides of the gear teeth opposite to those engaged by said power-driven pinion. Thus the gear drives such other pinion against the torque exerted by the spring device. According to one aspect of the invention means are provided for angularly adjusting parts of the drive connection to thereby vary this torque, so that its magnitude may be made sufficient to eliminate backlash from the spindle drive. Preferably the drive connection between the pinions comprises a pair of meshing helical gears, and the angular adjustment means comprises a means for adjusting one of these helical gears axially with respect to the other.

According to another aspect of the invention the power-driven pinion is a hypoid pinion rotatable about an axis perpendicular to and offset from the axis of the spindle on which the gear is mounted, such hypoid gearing being advantageous for the final reduction drive of the spindle inasmuch as it has superior characteristics as respects constant velocity motion transmission and load carrying ability.

The foregoing and other objects and advantages will appear from the following description of the two preferred embodiments of the invention shown in the accompanying drawings, wherein.

Fig. 3 is a vertical section through a modified form of spindle drive, in the two planes indicated by section line 3—3 of Fig. 4; and, Figs. 4 and 5 are respectively sections in planes 4—4 and 5—5 of Fig. 3.

Figure 1:
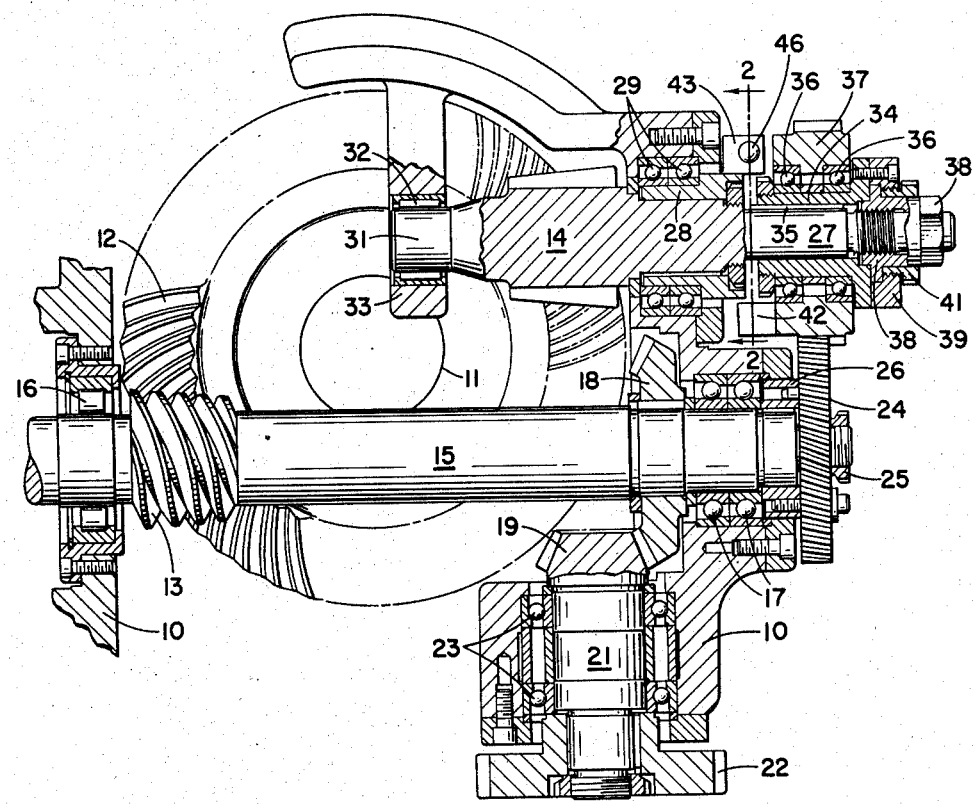
Fig. 1 is a vertical section through a spindle drive, in a plane perpendicular to the spindle axis.
Figure 2:
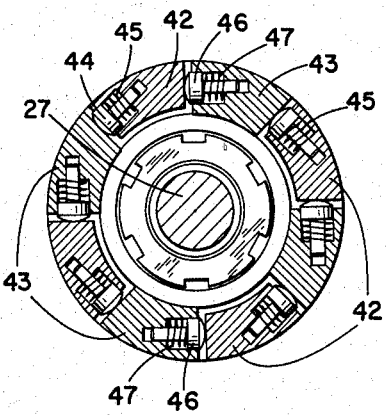
Fig. 2 is a detail section in plane 2—2 of Fig. 1.

Referring to Figs. 1 and 2, there is a multi-part frame 10 in which a spindle 11, in this case the cutter spindle of a spiral bevel or hypoid gear generating machine, is mounted for rotation in either direction. A hypoid gear 12 affixed to the spindle meshes with two high reduction hypoid pinions 13 and 14 which are identical as to tooth shape. Pinion 13 is integral with a shaft 15 journaled in a roller bearing 16 and in a pair of ball bearings 17. Shaft 15, which may be regarded as the main drive shaft of final reduction gearing, is itself driven through a bevel gear 18 which is keyed to it. A bevel pinion 19 meshing with gear 18 has secured to its shank 21 a spur gear 22 driven by a suitable drive pinion, not shown. The bevel pinion shank 21 is journaled for rotation in frame 10 by two axially spaced ball bearings 23.

A right hand helical gear 24 is secured to one end of shaft 15 by means of a nut 25, there being a collar 26 interposed between the gear 24 and the inner race of the outermost one of the ball bearings 17 whereby the axial preload of these bearings may be adjusted by trimming the collar 26. As shown the gear 24 is affixed to the collar by suitable fasteners and the collar is keyed to the shaft.

Affixed to the shank 27 of pinion 14 is a member 28 having a cylindrical portion supporting the inner races of a pair of ball bearings 29 whose outer races are secured to the frame. The pinion has a forward journal portion 31 supported by a needle bearing 32 carried by an outrigger part 33 of the frame 10. A sleeve 34 is slidable axially on shank 27 but is held against relative rotation by a key 35; and on the sleeve are two spaced roller bearings 36 supporting a left hand helical gear 37 for rotation in mesh with helical gear 24. A nut 38 is screw threaded to shank 27 and has a circumferential flange confined against axial motion between sleeve 34 and a cap 39 secured to the sleeve. A locking ring 41 is screw threaded into cap 39 into abutment with nut 38. The arrangement is such that upon first loosening ring 41 the nut 38 can be turned to adjust the gear 37 axially on shank 27 and relative to gear 24. In order to maintain adequate tooth contact in all positions of such adjustment the gear 37 has a greater face width than gear 24.

Gear 37 has four circumferentially spaced fingers 42 extending axially therefrom, to the left in Fig. 1; and extending into the spaces between fingers 42 are circumferentially spaced fingers 43 which extent axially, to the right, from member 28. Each finger 42 has a bore guiding a plunger 44 for abutment against the adjacent finger 43 that is counterclockwise thereof (as the parts appear in Fig. 2), each bore also containing a coil or other type of compression spring 45 back of the plunger. Similarly each finger 43 has a bore for a like plunger 46 and a backing spring 47, each plunger 46 bearing on the finger 42 that is counterclockwise thereof.

When the spindle 11 is to be driven counterclockwise, by driving engagement of the pinion 13 with the longitudinally convex tooth sides of gear 12, the gear 37 is adjusted axially to the right, to the position shown in Fig. 1. Because of the helical form of the teeth of gear 37, this adjustment results in the gear being rotated clockwise in Fig. 2, so that fingers 42 further compress springs 47 and cause them to exert a clockwise torque on fingers 43 of member 28 and also, through the latter, on pinion 14. Accordingly the teeth of pinion 14 are held in contact with the concave tooth sides of gear 12 under spring pressure. The amount of such pressure may be increased or decreased by increasing or decreasing the distance by which gear 37 is adjusted to the right. Increase of the compression of springs 47 is of course accompanied by a decrease in the compression of springs 45. Under the reverse condition, when spindle 11 is to be driven clockwise, so that the teeth of pinion 13 are to drive the longitudinally concave sides of the teeth of gear 12, the gear 37 is shifted to the left in Fig. 1 by adjusting of nut 38 to the left in Fig. 1, to thereby decompress springs 47 and compress springs 45 to the desired degree, this of course causing the convex sides of the teeth of gear 12 to be engaged under spring pressure by pinion 14. Thus, whichever direction or hand of cutter spindle drive is to be employed for a particular operation of the machine, the device may be adjusted accordingly to prevent backlash from taking place in the final reduction drive gears 13, 12. As before mentioned, the pinions 13, 14 are identical, in the illustrated embodiment each being a four-tooth right hand pinion, while the drive gear 12 has forty teeth, so that the ratio of the final gear reduction is 1:10. The helical gears 24, 37 are both of the same tooth number, fifty in the illustrated case.

In the embodiment illustrated in Figs. 3, 4 and 5, the machine frame is designated as 50, the cutter spindle as 51 and the hypoid gear on the spindle as 52. The gear is driven by a hypoid pinion 53 formed integrally with a main drive shaft 54 supported by tapered roller bearings 55 and by roller bearing 56 for the front journal portion 57 of the pinion. Formed integrally with hypoid pinion 53 is a spur pinion 58 meshing with a spur gear 59 affixed to a counter-shaft 61 which is journaled on ball bearings 62 and roller bearing 63. Fast on shaft 61 is a bevel pinion 60 for driving parts of the machine not concerned with the present invention. A sleeve 64 is slidable on the shaft but is held against rotation thereon by a key 65. The sleeve supports ball bearings 66 on which a right hand helical gear 67 is rotatable. Extending axially from the hub of this gear are two diametrically opposed fingers 68, each carrying a hardened bearing plug 69. Two diametrically opposed fingers 71 extending axially from bevel gear 60 have bores containing plungers 72 and backing springs 73 for the plungers. Each plunger abuts the adjacent bearing plug 69 under spring pressure. For the purpose of adjusting the sleeve 64 and the gear 67 axially to the left on shaft 61, an adjusting nut 74 is screw threaded onto the shaft in abutment with the sleeve. A locking plug 75 and clamp screw 76 for the plug are provided.

Gear 67 meshes with a left hand helical gear 77 affixed to a shaft 78 which is parallel to shafts 54 and 61 and has integral therewith a spiral bevel pinion 79. This pinion meshes with gear 52 and is so positioned that its axis intersects the axis of gear 52 at right angles at the point designated 80. Shaft 78 is journaled for rotation in the frame on ball bearings 81 and roller bearing 82.

Gears 67 and 77 are of the same tooth number, but as shown pinion 58 is of smaller diameter than gear 59, it having thirty-five teeth as compared with sixty-three teeth on the gear. The tooth number ratio, thiry-five to sixty-three, is the reciprocal of the angular velocity ratio between shaft 54 and shaft 79 and is the equivalent of the tooth number ratio between hypoid pinion 53 and spiral bevel gear 79 whose tooth numbers are respectively five and nine. While both of these pinions 79, 53 must have the same normal pitch, the hypoid offset of pinion 53 results in the latter having a much greater spiral angle than the pinion 79. Because of this it has a larger circular pitch than the pinion 79, which accounts for the difference in tooth number of the two pinions despite their approximate equality of diameter. The gear 52 has one hundred teeth, so that a final reduction ratio of 1:20 is provided despite the relatively large size of the pinion 53 and its resulting great strength.

The spindle drive shown in Figs. 3 to 5 is intended for operation in one direction only, i.e. with the spindle 51 rotating clockwise in Fig. 3. Accordingly the hypoid pinion 53 engages the longitudinally convex sides of the gear teeth, and the shafts 54 and 78 rotate clockwise as they are viewed in Fig. 4, while the oppositely rotating shaft 61 turns clockwise as viewed in Fig. 5. The effect of springs 73 is to urge gear 67, 68 counterclockwise (in Fig. 5) relative to shaft 61, and, through the gear 77, to cause the pinion 79 to contact the longitudinally concave sides of the gear teeth under spring pressure, to thereby eliminate backlash between the final drive gears 52, 53.

Because of the right hand helix angle of the teeth of gear 67, the torque applied to the gear by springs 73 tends to shift the gear and its supporting sleeve 64 to the right in Fig. 3, against nut 74. Accordingly, by adjusting the latter to the left (after first loosening clamp screw 76) the compression of springs 73 may be increased to whatever value is necessary to maintain the teeth of gears 53, 52 in continuous contact.

Having now described the preferred embodiments of my invention, what I claim is:

1. A backlash-free spindle drive comprising a gear on the spindle, a hypoid pinion meshing with the gear and rotatable about an axis perpendicular to and offset from the spindle axis, a second pinion meshing with the gear and rotatable about an axis parallel to the axis of said hypoid pinion, a drive train connecting said pinions for maintaining them in constant velocity ratio to each other, said drive train including yieldable means acting to turn said pinions in opposite directions with respect to the gear whereby to maintain the pinions in contact with opposite sides of the gear teeth, said yieldable means comprising a torsion spring device, and said drive train including means for effecting angular adjustment of the parts thereof to thereby vary the torque exerted by said torsion spring device.

2. A spindle drive according to claim 1 in which said spring device is adapted for torsional flexure in either direction, whereby the direction of the torque exerted by said spring device may be reversed by said angular adjustment of the parts of the drive train.

3. A spindle drive according to claim 1 in which said torsion spring device comprises a pair of coaxial members each of which has a plurality of circumferentially spaced fingers, compression springs carried by the fingers of at least one member, each such spring being arranged in a bore in the related finger, a plunger in each such bore backed by the spring and adapted to contact an adjacent finger on the other member.

4. A spindle drive according to claim 1 in which said drive train includes a pair of helical gears and said means for effecting angular adjustment comprises means to adjust said helical gears relative to each other in an axial direction.

5. A spindle drive according to claim 1 in which the axis of said second pinion intersects the axis of the gear, said second pinion is of larger tooth number than said first mentioned pinion, and said drive train is arranged to drive said first mentioned pinion and said second pinion at an angular velocity ratio which is the reciprocal of ratio of the respective tooth numbers of said pinions.

6. A spindle drive according to claim 5 in which the maximum pitch diameters of said pinions are approximately equal.

7. Backlash-free gearing comprising a drive shaft and a driven shaft in perpendicular and offset relationship to each other, a third shaft parallel to the drive shaft and offset from the driven shaft an equal distance but in the opposite direction from said drive shaft, a first hypoid pinion on the drive shaft, a gear on the driven shaft meshing with said pinion, a second hypoid pinion on said third shaft meshing with said gear in a zone diametrically opposed to the zone in which the first hypoid pinion meshes with the gear, a drive between said hypoid pinions comprising a pair of gears connecting the drive shaft and said third shaft, resilient means acting in torsion in said drive, and means in said drive for effecting angular adjustment of the parts thereof to thereby vary the torque exerted by said resilient means.

8. Backlash-free gearing comprising a drive shaft and a driven shaft in perpendicular and offset relationship to each other, a third shaft parallel to the drive shaft and offset from the driven shaft by the same distance as the drive shaft but in the opposite direction, a first hypoid pinion on the drive shaft, a gear on the driven shaft meshing with said pinion, a second hypoid pinion on said third shaft meshing with said gear in a zone diametrically opposed to the zone in which the first hypoid pinion meshes with the gear, a drive between said hypoid pinions comprising a pair of gears connecting the drive shaft and said third shaft, resilient means acting in torsion in said drive, said drive including a pair of coaxial members each member of which has a plurality of circumferentially spaced fingers entering into the intertooth spaces of the other member, compression springs arranged to act between adjacent fingers whereby upon relative rotation of said members in one direction the set of springs on one side of the fingers of one member will be compressed and upon relative rotation in the opposite direction the set of springs on the opposite side of the fingers of said one member will be compressed, and means for effecting relative angular adjustment of two elements in the drive between said hypoid pinions, for thereby increasing the compression of either set of springs and concomitantly decreasing the compression of the other set.

9. Gearing according to claim 8 in which said pair of gears are of the helical type and said means for effecting relative angular adjustment comprises screw-threaded means for adjusting one gear of the pair axially with respect to the other gear of the pair.

10. Gearing according to claim 8 in which one of said coaxial members comprises one of said helical gears.

11. A backlash-free drive comprising a driven gear and two pinions meshing with the gear, one pinion being power-driven and being the driver for the gear and the other pinion being adapted to be driven by the gear, a drive connection between the pinions comprising a torsion spring device for continuously exerting torque to maintain said other pinion in engagement with the sides of the gear teeth opposite to those engaged by said one pinion, and means for angularly adjusting parts of said drive connection to thereby vary the torque exerted by said torsion spring device.

12. A drive according to claim 11 in which the torsion spring device is adapted for torsional flexure in either direction, whereby the effect of said device may be reversed, to thereby shift the tooth contact from one side of the teeth to the other, by such angular adjustment of said parts, when the direction of drive of the gear by said one pinion is to be reversed.

13. A drive according to claim 12 in which said spring device comprises a pair of coaxial members each member of which has a plurality of circumferentially spaced fingers entering into the intertooth spaces of the other member, compression springs arranged to act between adjacent fingers, whereby upon relative rotation of said members in one direction the set of springs on one side of the fingers of one member will be compressed and upon relative rotation in the opposite direction the set of springs on the other side of the last-mentioned fingers will be compressed.

14. A backlash-free spindle drive comprising a gear on the spindle, a power-driven hypoid pinion meshing with the gear for driving the same and rotatable about an axis perpendicular to and offset from the spindle axis, a second pinion meshing with the gear, and a drive train connecting said pinions for maintaining them in constant velocity ratio to each other, said drive train including a torsion spring device acting to maintain the second pinion in engagement with the sides of the gear teeth opposite to those engaged by said hypoid pinion, whereby the gear will drive said second pinion against the torque exerted by the spring device.

15. A drive according to claim 11 in which said drive connection comprises a pair of meshing helical gears, and said means for angularly adjusting parts comprises a means for adjusting one of these helical gears axially relative to the other.

References Cited in the file of this patent

UNITED STATES PATENTS

| 1,284,268 | Eaton | Nov. 12, 1918 |
| 1,460,131 | Holy | June 26, 1923 |
| 1,734,043 | Nelson | Nov. 5, 1929 |
| 2,565,539 | Wildhaber | Aug. 28, 1951 |
| 2,717,522 | Mattu | Sept. 13, 1955 |

FOREIGN PATENTS

| 385,431 | Germany | Nov. 23, 1923 |
| 424,432 | Germany | Jan. 23, 1926 |